US006612537B2

(12) United States Patent  (10) Patent No.: US 6,612,537 B2
Bartlett  (45) Date of Patent: Sep. 2, 2003

(54) CARTRIDGE GATE VALVE

(75) Inventor: Christopher D. Bartlett, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 118 days.

(21) Appl. No.: 09/815,391

(22) Filed: Mar. 22, 2001

(65) Prior Publication Data

US 2001/0042848 A1 Nov. 22, 2001

Related U.S. Application Data

(60) Provisional application No. 60/192,124, filed on Mar. 24, 2000.

(51) Int. Cl.[7] .............................................. F16K 3/02
(52) U.S. Cl. ........................ 251/62; 251/31; 251/328; 251/360
(58) Field of Search ........................... 251/31, 62, 63, 251/326, 327, 328, 329, 360

(56) References Cited

U.S. PATENT DOCUMENTS

| 3,635,436 A | * | 1/1972 | Tillman ..................... 251/31 |
| 4,099,904 A | * | 7/1978 | Dawson .................... 251/31 X |
| RE30,115 E | * | 10/1979 | Herd et al. ................ 251/63.6 |
| 4,294,284 A | * | 10/1981 | Herd ...................... 251/327 X |
| 4,412,671 A | * | 11/1983 | Tiefenthaler ................ 251/31 |
| 4,467,833 A | * | 8/1984 | Satterwhite et al. ...... 251/31 X |
| 4,572,298 A | * | 2/1986 | Weston .................. 251/327 X |
| 4,647,005 A | * | 3/1987 | Hunter ...................... 251/63 |
| 4,809,733 A | * | 3/1989 | Hawkins ................. 251/62 X |
| 5,409,040 A | * | 4/1995 | Tomlin ................. 137/625.66 |
| 5,415,378 A | * | 5/1995 | Craven ...................... 251/329 |
| 6,145,594 A | * | 11/2000 | Jones ....................... 166/368 |

FOREIGN PATENT DOCUMENTS

| DE | 2152748 | * 4/1973 | ............. F16K/3/20 |
| EP | 624711 A1 | * 11/1994 | ........... E21B/34/02 |

* cited by examiner

Primary Examiner—Gene Mancene
Assistant Examiner—Eric Keasel
(74) Attorney, Agent, or Firm—Henry C. Query, Jr.

(57) ABSTRACT

The present invention is directed to a compact and modular gate valve comprising an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole; a first seat which is mounted in a first intersection of the bore with the hole and a second seat which is mounted in a second intersection of the bore with the hole, the first and second seats each including a passageway that aligns with the bore; a valve stem which is slidably positioned in the hole and which includes first and second piston portions that are separated by a gate portion, the stem being movable between an open position in which a hole in the gate portion is aligned with the passageways and a closed position in which the hole is offset from the passageways; and first and second seals which are positioned between the hole and the first and second piston portions, respectively; wherein hydraulic pressure in a first piston chamber defined by the first piston portion, the first seal and the hole will move the gate from the open position to the closed position, and hydraulic pressure in a second piston chamber defined by the second piston portion, the second seal and the hole will move the gate from the closed position to the open position.

10 Claims, 3 Drawing Sheets

CARTRIDGE GATE VALVE

This application is based on U.S. Provisional Patent Application No. 60/192,124, which was filed on Mar. 24, 2000.

BACKGROUND OF THE INVENTION

The present invention relates to a gate valve. More particularly, the invention relates to a gate valve which comprises a compact assembly of easy to manufacture components that can be readily miniaturized to produce a small yet reliable flow control device.

Prior art gate valves, especially those used in the oil and gas industry, typically comprise a valve body, a flow passage which extends through the body between an inlet port and an outlet port, a gate cavity which extends partially through the body generally transverse to the flow passage, and a gate which is slidably disposed between a pair of seats that are mounted in the flow passage. Each seat includes a through bore which aligns with the flow passage, and the gate comprises a transverse hole which aligns with the through bores when the gate valve is in the open condition. The gate is connected to a valve stem which is rotationally supported in a bonnet that is connected to the valve body over the gate cavity. In operation, the valve stem is rotated to raise or lower the gate and bring the hole into or out of alignment with the through bores to thereby either open or close the flow passage, respectively.

These prior art gate valves typically comprise a large number of parts which are relatively difficult to manufacture and time consuming to assemble. Moreover, while gate valves are usually robust closure members, their large number of parts makes servicing these valves somewhat difficult. In addition, prior art gate valves are generally too large to be used in certain components which have relatively small volumes or cross sectional areas, such as the tubing hanger or tree cap components of flow completion assemblies for producing oil or gas from subsea wells.

Therefore, a need exists for a simplified gate valve which is simple to manufacture and which is small enough to be used in certain flow completion system components which have limited space for such valves.

SUMMARY OF THE INVENTION

In accordance with the present invention, these and other disadvantages in the prior art are overcome by providing a gate valve which comprises an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole; first and second seats which are mounted in respective ends of the bore and which each include a passageway that aligns with the bore; a valve stem which is slidably positioned in the hole and which includes first and second piston portions that are separated by a gate portion, the stem being movable between an open position in which a hole in the gate portion is aligned with the passageways and a closed position in which the hole is offset from the passageways; and first and second means for sealing the first and second piston portions, respectively, against the hole. With this configuration, hydraulic pressure in a first piston chamber defined by the first piston portion, the first sealing means and the hole will move the gate from the open position to the closed position, and hydraulic pressure in a second piston chamber defined by the second piston portion, the second sealing means and the hole will move the gate from the closed position to the open position.

Thus, it may be seen that the gate valve of the present invention comprises a simple, modular construction. In addition, since the components of the gate valve are relatively uncomplicated, they may be easily scaled down to produce a gate valve which is sufficiently small to be used in several flow completion system components in which space is limited. Thus, the gate valve may be particularly advantageous for such flow completion system components as tree caps, controls bridges, tubing hangers or downhole devices.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
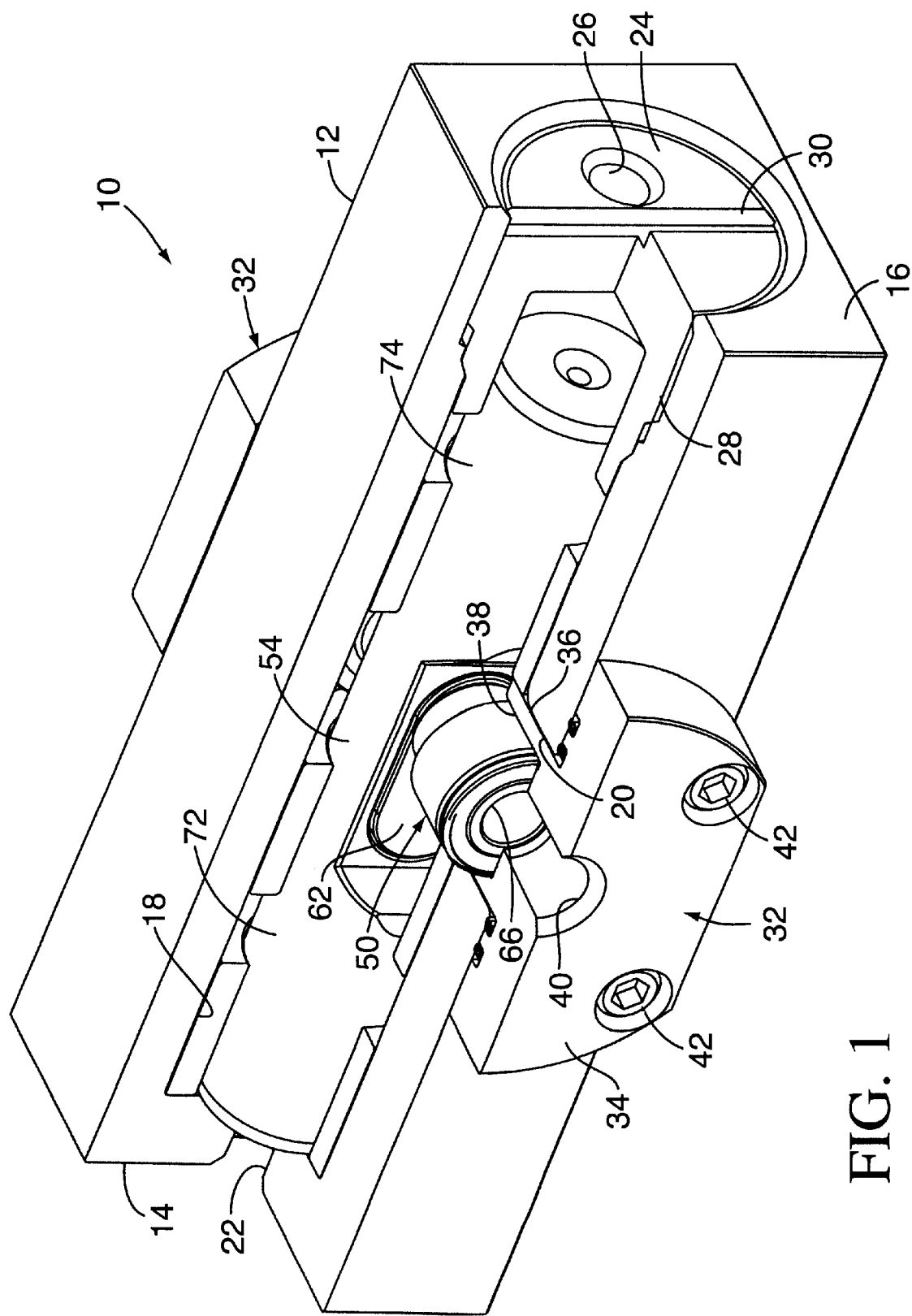
FIG. 1 is a perspective cutaway view of the gate valve of the present invention.
Figure 2:
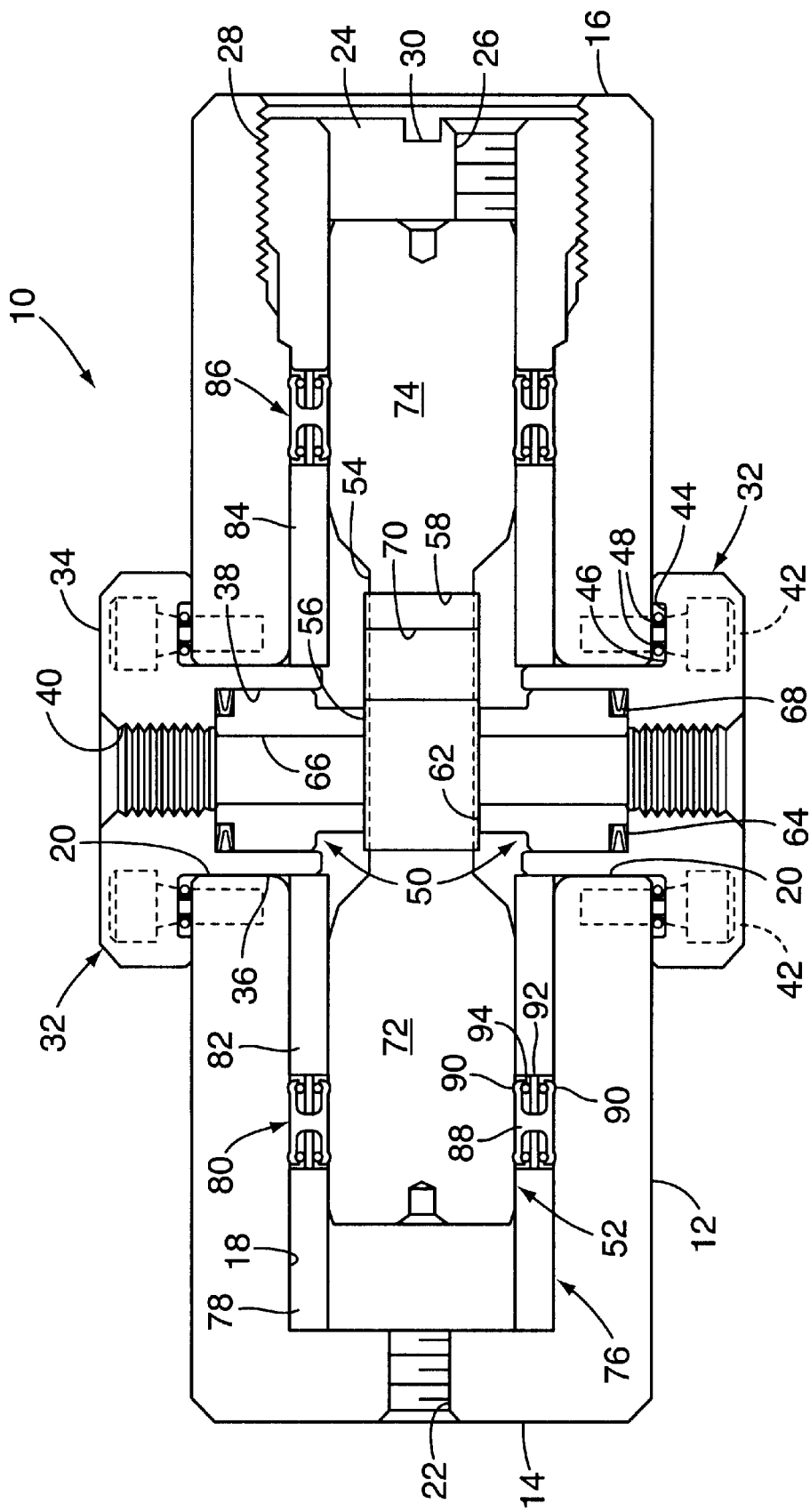
FIG. 2 is a longitudinal cross-sectional view of the gate valve of FIG. 1.

Referring to FIGS. 1 and 2, the gate valve of the present invention, which is indicated generally by reference number 10, is shown to comprise an elongated body 12 which includes first and second ends 14 and 16, respectively, a hole 18 which extends axially from the first end 14 toward the second end 16, a cylindrical bore 20 which extends transversely through the body 12 and intersects the hole 18 about midway between the first and second ends, a first opening 22 which is formed through the first end 14 and communicates with the hole 18, and a plug 24 which is secured in the second end 16 and which includes a second opening 26 that communicates with the hole 18. The first and second openings 22, 26 may be connected to a source of hydraulic pressure through standard fittings and conduits (not shown). In addition, the plug 24 is preferably secured in the first end with threads 28 and ideally also includes a slot 30 for a tool to facilitate screwing the plug into and out of the hole 18.

The gate valve 10 also comprises two caps 32, each of which is mounted in a respective end of the bore 20. Each cap 32 includes a base portion 34, an annular plug portion 36 which depends from the base portion, a receptacle 38 which is formed coaxially in the plug portion, and an opening 40 which extends through the base portion to the receptacle. The openings 40 may be connected with corresponding fluid flow conduits using standard fittings (not shown). In addition, each cap 32 is attached to the body 12 by suitable means, such as with a number of screws 42 that extend through corresponding holes which are, formed in the base portion 34. Each cap 32 optimally also comprises first and second concentric annular recesses 44, 46 which are formed coaxially with the bore 20 in the surface of the base portion 34 adjacent the body 12. A suitable seal, such as a metal C-ring face seal 48 which includes an internal energizing ring, is ideally positioned in each recess 44, 46 to seal between the body 12 and the cap 32. In addition, the seal 48 in the recess 44 is preferably oriented such that its opening faces outward, and the seal in the recess 46 is oriented such that its opening faces inward, so that the seals may be enhanced by the external and internal pressures, respectively, acting on the gate valve 10.

The gate valve 10 also comprises two seats 50, each of which is positioned in a receptacle 38 of a corresponding cap 32, a stem 52 which includes a central reduced neck portion 54, and a gate insert 56 which is positioned between the seats 50 in an aperture 58 that is formed in the neck portion. Each seat 50 includes a generally annular body 60 which is received in the receptacle 38, a front face 62 which sealingly engages the gate insert 56, a circular groove 64 which is formed in the body 60 opposite the front face, and an axial passageway 66 which extends completely through the body 60 and aligns with the opening 40 in the cap 32. Furthermore, a seal 68 which preferably includes an internal energizing ring, such as the Omniseal 1100A face seal, is positioned in the groove 64 to both seal between the seat 50 and the body 12 and urge the seat into engagement with the gate insert 56.

The stem 52 is permitted to slide within the hole 18 to move the gate insert 56 between an open position, in which a transverse opening 70 in the gate insert is aligned with the passageways 66, and a closed position, in which the opening 70 is offset from the passageways. Thus, the stem 52 includes first and second preferably integral piston portions 72, 74 which are positioned on opposite ends of the neck portion 54. The piston portions 72, 74 are sealed against the hole 18 by a seal sleeve 76 which comprises, as viewed from left to right in FIG. 2, a first spacer sleeve 78 that is positioned adjacent the first end 14, a first seal assembly 80 that is positioned adjacent the first spacer sleeve, a second spacer sleeve 82 that is positioned between the first seal assembly and one side of the plug portion 36 of each cap 32, a third spacer sleeve 84 that is positioned adjacent the opposite side of plug portion 36, and a second seal assembly 86 that is positioned between the third spacer sleeve and the plug 24. Each preferred seal assembly 80, 86 comprises in cross section a preferably non-metallic H-shaped sealing member 88 which includes two pairs of parallel legs that are connected by a transverse base, an outwardly directed sealing lip 90 which is formed adjacent each end of each leg, a spacer ring 92 which is disposed between the legs of each pair, and an energizing ring 94 which is positioned between the spacer ring and each leg.

In operation of the gate valve 10, hydraulic fluid is introduced through the first opening 22 into a first piston chamber defined by the hole 18, the first piston portion 72 and the first seal assembly 80 to force the stem to move from a first position which is shown in FIG. 1 to a second position which is shown in FIG. 2. In the first position, the opening 70 in the gate insert 56 is aligned with the passageways 66 in the seats 32, and the gate valve is therefore open. In order to close the gate valve 10, hydraulic fluid is introduced into a second piston chamber defined by the hole 18, the second piston portion 74 and the second seal assembly 86 to move the stem from the second position which is shown in FIG. 2 back to the first position which is shown in FIG. 1. In the second position, the opening 70 in the gate insert 56 is offset from the passageways 66 in the seats 32 and the gate valve 10 is therefore closed.

Figure 3:
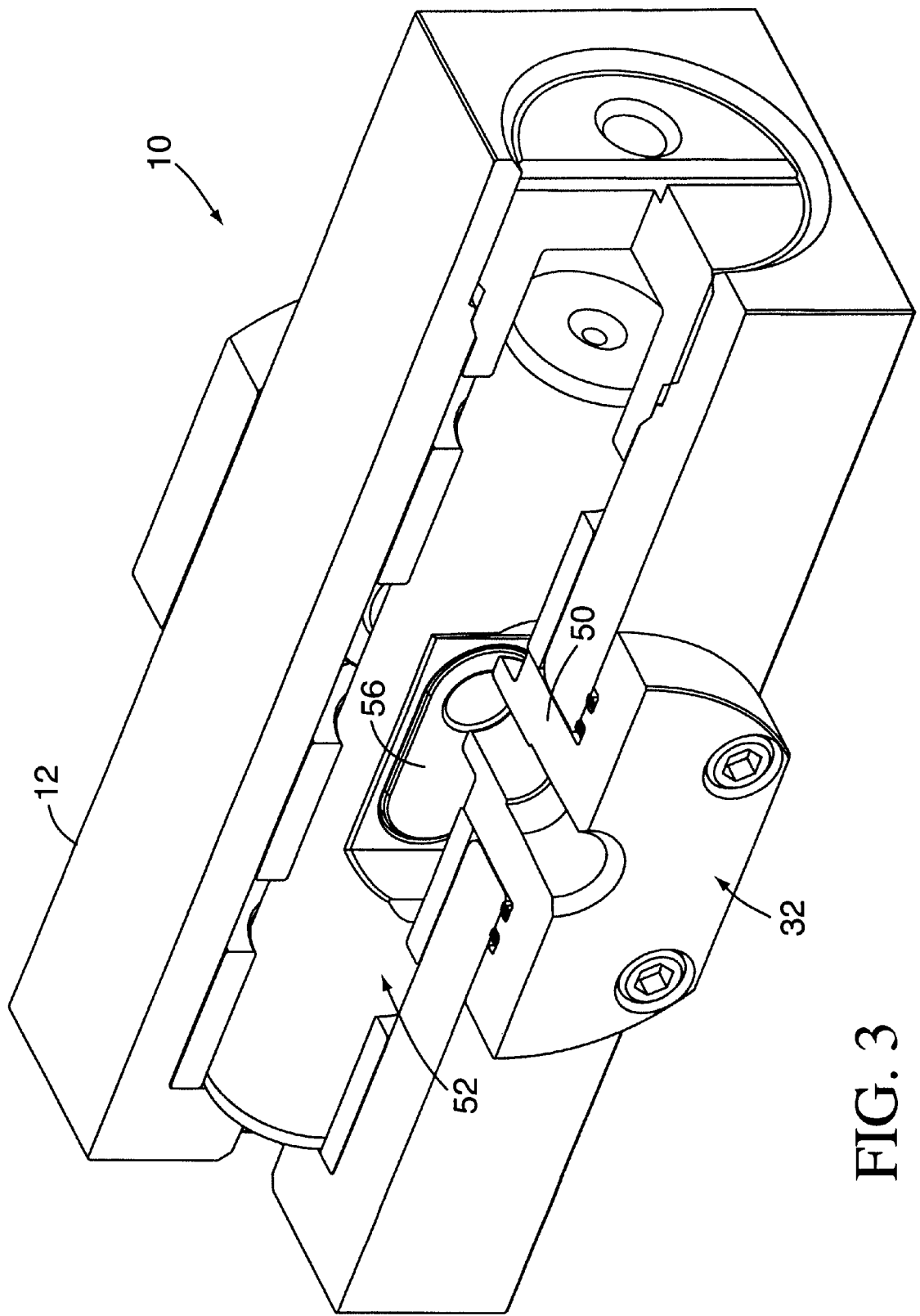
FIG. 3 is a perspective cutaway view of another embodiment of the gate valve of the present invention.

Several alternative constructions for the gate valve 10 are possible. For example, the hole 18 could extend completely through the body 12 and be closed by a second plug similar to the plug 24. Also, the seal sleeves 76 could be eliminated and the piston portions 72, 74 of the stem 52 instead designed to be slidably received in the hole 18, with suitable seals disposed in the hole or in corresponding grooves formed on the piston portions to thereby define the first and second piston chambers. In addition, one or both of the caps 32 could be eliminated and the seats 50 instead received in corresponding seat pockets that are formed in the body 12 at the intersection of the bore 20 with the hole 18. Alternatively, as shown in FIG. 3, one or both seats 50 may be formed integrally with its corresponding cap 32.

In addition, two or more gate valves 10 may be stacked in parallel to form an assembly of individually actuated gate valves. Alternatively, two or more gate valves may be connected in series to form an assembly of simultaneously actuated gate valves. One manner of accomplishing this would be to elongate the body 12 to accommodate two or more assemblies of stems 52 and seats 50. Another way to accomplish a series assembly of gate valves would be to extend the hole 18 completely through the body 12 and connect the bodies of adjacent gate valves with a nipple or other suitable fluid coupling. Other variations of the gate valve 10 may also be derived from the teachings herein and are therefore considered to be within the scope of the present invention.

Thus, it may be seen that the gate valve 10 comprises a simple assembly of relatively few components; In addition, the gate valve 10 is somewhat modular in that it comprises several interchangeable components. For example, the gate valve comprises three identical spacer sleeves 78, 82, 84, two like seal assemblies 80, 86, two matching caps 32, and two identical seats 50. This further simplifies the manufacture of the gate valve. Furthermore, the components of the gate valve are generally uncomplicated and therefore easy to scale down to produce a gate valve which is sufficiently small to be used in several flow completion system components in which space is limited.

An exemplary flow completion system which comprises several components in which the gate valve of the present invention may be employed is discussed in U.S. Pat. No. 6,494,257, which is commonly owned herewith and is hereby incorporated herein by reference, This flow completion system comprises a wellhead housing which is installed at the upper end of a well bore, a tubing spool which is connected over the wellhead housing, a tubing hanger which is supported in the well bore and which comprises an axial annulus bore and possibly one or more axial service and control conduits, a controls bridge which is connected to the tubing hanger or the tubing spool and which facilitates the connection of external service and control lines to corresponding service and control conduits through the top of the tubing hanger, and a non pressure-containing tree cap which is installed in the tubing spool above the tubing hanger and which may include an annulus seal stab defining a flow conduit which is attached to the tubing annulus through the top of the tubing hanger. Thus, the gate valve may be attached to or installed in the tubing hanger to control the flow through the annulus bore or a service and control conduit. In addition, the gate valve may be mounted in the controls bridge to control the flow between a service and control conduit in the tubing hanger and a corresponding external service and control line. Also, the gate valve may be installed in the tree cap to control the flow through, for example, the flow conduit which is connected to the tubing annulus through the annulus seal stab. It should be apparent from the preceding discussion that the gate valve of the present invention may be similarly employed in other types of flow completion systems.

It should be recognized that, while the present invention has been described in relation to the preferred embodiments thereof, those skilled in the art may develop a wide variation of structural and operational details without departing from the principles of the invention. For example different features of the various embodiments may be combined in a manner not discussed herein. Therefore, the appended claims are to be construed to cover all equivalents falling within the true scope and spirit of the invention.

What is claimed is:

1. A gate valve which comprises:

an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole;

a first seat which is mounted in a first intersection of the bore with the hole and a second seat which is mounted in a second intersection of the bore with the hole, the first and second seats each including a passageway that aligns with the bore;

a valve stem which is slidably positioned in the hole and which includes first and second piston portions that are separated by a gate portion, the stem being movable between an open position in which an opening in the gate portion is aligned with the passageways and a closed position in which the opening is offset from the passageways; and first and second seals which are positioned in the hole between the body and the first and second piston portions, respectively;

wherein hydraulic pressure in a first piston chamber defined by a first portion of the hole which is bounded by the first piston portion, the first seal and the body will move the gate portion from the open position to the closed position, and hydraulic pressure in a second piston chamber defined by a second portion of the hole which is bounded by the second piston portion, the second seal and the body will move the gate portion from the closed position to the open position;

wherein the gate portion comprises a gate insert which is positioned in a corresponding aperture that is formed in the valve stem;

a first cap which is secured to the body over the bore proximate the first intersection; and a second cap which is secured to the body over the bore proximate the second intersection;

wherein the first seat is integral with the first cap.

2. The gate valve of claim 1, wherein the second seat is integral with the second cap.

3. The gate valve of claim 2, wherein the first and second caps are interchangeable.

4. A gate valve which comprises:

an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole;

a first seat which is mounted in a first intersection of the bore with the hole and a second seat which is mounted in a second intersection of the bore with the hole, the first and second seats each including a passageway that aligns with the bore;

a valve stem which is slidably positioned in the hole and which includes first and second piston portions that are separated by a gate portion, the stem being movable between an open position in which an opening in the gate portion is aligned with the passageways and a closed position in which the opening is offset from the passageways; and first and second seals which are positioned in the hole between the body and the first and second piston portions, respectively;

wherein hydraulic pressure in a first piston chamber defined by a first portion of the hole which is bounded by the first piston portion, the first seal and the body will move the gate portion from the open position to the closed position, and hydraulic pressure in a second piston chamber defined by a second portion of the hole which is bounded by the second piston portion, the second seal and the body will move the gate portion from the closed position to the open position;

wherein the gate portion comprises a gate insert which is positioned in a corresponding aperture that is formed in the valve stem; and wherein the first and second seals comprise part of a seal sleeve which is positioned between the hole and the valve stem and which includes:

a first spacer sleeve which is positioned between the first end and the first seal;

a second spacer sleeve which is positioned between the first seal and the first and second seats; and a third spacer sleeve which is positioned between the second seal and the first and second seats.

5. The gate valve of claim 4, wherein the first, second and third spacer sleeves are interchangeable.

6. In combination with a flow completion system which comprises a component through which fluid is permitted to flow, a closure member which comprises:

an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole;

a first seat which is mounted in a first intersection of the bore with the hole and a second seat which is mounted in a second intersection of the bore with the hole, the first and second seats each including a passageway that aligns with the bore;

a valve stem which is slidably positioned in the hole and which includes first and second piston portions that are separated by a gate portion, the stem being movable between an open position in which an opening in the gate portion is aligned with the passageways and a closed position in which the opening is offset from the passageways; and first and second seals which are positioned in the hole between the body and the first and second piston portions, respectively;

wherein hydraulic pressure in a first piston chamber defined by a first portion of the hole which is bounded by the first piston portion, the first seal and the body will move the gate portion from the open position to the closed position, and hydraulic pressure in a second piston chamber defined by a second portion of the hole which is bounded by the second piston portion, the second seal and the body will move the gate portion from the closed position to the open position;

wherein the gate portion comprises a gate insert which is positioned in a corresponding aperture that is formed in the valve stem;

a first cap which is secured to the body over the bore proximate the first intersection; and a second cap which is secured to the body over the bore proximate the second intersection;

wherein the first seat is integral with the first cap.

7. The flow completion system of claim 6, wherein the second seat is integral with the second cap.

8. The flow completion system of claim 7, wherein the first and second caps are interchangeable.

9. In combination with a flow completion system which comprises a component through which fluid is permitted to flow, a closure member which comprises:

an elongated body which comprises first and second ends, a hole which extends longitudinally between the first and second ends, a first opening which communicates with the hole proximate the first end, a second opening which communicates with the hole proximate the second end, and a bore which extends transversely through the body and intersects the hole;

a first seat which is mounted in a first intersection of the bore with the hole and a second seat which is mounted in a second intersection of the bore with the hole, the first and second seats each including a passageway that aligns with the bore;

a valve stem which is slidably positioned in the hole and which includes first and second piston portions that are separated by a gate portion, the stem being movable between an open position in which an opening in the gate portion is aligned with the passageways and a closed position in which the opening is offset from the passageways; and first and second seals which are positioned in the hole between the body and the first and second piston portions, respectively;

wherein hydraulic pressure in a first piston chamber defined by a first portion of the hole which is bounded by the first piston portion, the first seal and the body will move the gate portion from the open position to the closed position, and hydraulic pressure in a second piston chamber defined by a second portion of the hole which is bounded by the second piston portion, the second seal and the body will move the gate portion from the closed position to the open position;

wherein the gate portion comprises a gate insert which is positioned in a corresponding aperture that is formed in the valve stem; and wherein the first and second seals comprise part of a seal sleeve which is positioned between the hole and the valve stem and which includes:

a first spacer sleeve which is positioned between the first end and the first seal;

a second spacer sleeve which is positioned between the first seal and the first and second seats; and a third spacer sleeve which is positioned between the second seal and the first and second seats.

10. The flow completion system of claim 9, wherein the first, second and third spacer sleeves are interchangeable.

\* \* \* \* \*